(12) United States Patent
Cronce

(10) Patent No.: US 6,274,051 B1
(45) Date of Patent: Aug. 14, 2001

(54) METHOD FOR NEUTRALIZING ORGANOPHOSPHORUS AGRICULTURAL CHEMICALS

(75) Inventor: Donald T. Cronce, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/606,113

(22) Filed: Jun. 8, 2000

(51) Int. Cl.[7] .................................................. C02F 1/72
(52) U.S. Cl. ..................... 210/758; 210/753; 210/759; 210/906; 210/908
(58) Field of Search .................................. 210/753, 758, 210/759, 764, 906, 908

(56) References Cited

U.S. PATENT DOCUMENTS

| | | | |
|---|---|---|---|
| 4,263,305 | * 4/1981 | Epstein et al. | |
| 4,477,355 | 10/1984 | Liberti et al. | 210/665 |
| 5,137,639 | 8/1992 | Guzik et al. | 210/679 |
| 5,268,308 | 12/1993 | Miller, Jr. | 436/542 |
| 5,512,526 | 4/1996 | Greco | 502/80 |
| 5,667,694 | 9/1997 | Cody et al. | 210/679 |
| 5,760,089 | 6/1998 | Cronce | 514/643 |
| 5,859,064 | 1/1999 | Cronce | 514/643 |

\* cited by examiner

Primary Examiner—David A. Simmons
Assistant Examiner—Betsey Morrison Hoey
(74) Attorney, Agent, or Firm—James B. Bechtel, Esq.; Wyatt B. Pratt, Esq.

(57) ABSTRACT

A method for neutralizing organophosphorus agricultural chemicals with a composition having a quaternary ammonium complex component, an oxidizer component and a solvent. After an organophosphorus agricultural chemical is passed through a pathway, an agricultural chemical neutralizer is used to neutralize residual agricultural chemical within the pathway.

20 Claims, No Drawings

METHOD FOR NEUTRALIZING ORGANOPHOSPHORUS AGRICULTURAL CHEMICALS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates to a method for neutralizing organophosphorus agricultural chemicals. More particularly, the organophosphorus agricultural chemicals are passed through a processing pathway, such as a pesticide dispenser or chicken waste collector, after which an agricultural chemical neutralizer is processed through the processing pathway. Most particularly, the agricultural chemical neutralizer is metered through the processing pathway in a manner to replicate the flow of the organophosphorus agricultural chemicals therethrough. The agricultural chemical neutralizer preferably includes a quaternary ammonium complex (QAC), an oxidizer and solvent for effectively neutralizing the contaminant residual or concentrated organophosphorus agricultural chemicals.

2. Brief Description of the Related Art

Organophosphorus agricultural chemicals include pesticides having a phosphorus atom double bonded to either an oxygen or sulfur atom, such as diazinon, malathion, paraoxon, dichlorovos and methamidophos. Organophosphorus agricultural chemicals also include animal waste, such as poultry feces, which contaminate waterways, killing fish close to agricultural centers. Heretofore, methods of eliminating safety hazards from high concentrations of these organophosphorus agricultural chemicals have included flushing or rinsing the contaminated areas with large amounts of water to dilute the chemicals which has been increasingly shown to deleteriously affect large ecosystems over extended periods of time.

Neutralization of chemical and biological warfare agents has been described in U.S. Pat. No. 5,760,089 entitled Chemical Warfare Agent Decontaminant Solution Using Quaternary Ammonium Complexes, issued on Jun. 2, 1998, and U.S. Pat. No. 5,859,064 entitled Chemical Warfare Agent Decontamination Solution, issued on Jan. 12, 1999, both patents to Donald T. Cronce and assigned to the United States Navy, and in pending U.S. patent application, Ser. No. 09/533,954, entitled Chemical Warfare Agent Decontamination Foaming Composition and Method, filed on Mar. 22, 2000, to Donald T. Cronce and assigned to the United States Navy, the disclosures of the patents and application are incorporated herein by reference. Within the issued patents the chemical warfare agent decontaminating solution is described as applicable to neutralizing organophosphorus agricultural chemicals in a manner equivalent to neutralization of chemical warfare agents, generally over large or unconfined areas of contamination.

In view of the foregoing, there is a need for a method for neutralizing concentrated and residue organophosphorus agricultural chemicals that contaminate limited areas in an effective and safe manner. The present invention addresses this and other needs.

SUMMARY OF THE INVENTION

The present invention includes a method for neutralizing organophosphorus agricultural chemicals, comprising the steps of passing an agricultural chemical through a processing pathway and then metering an agricultural chemical neutralizer in the processing pathway effective to neutralize organophosphorus agricultural chemical therein. The agricultural chemical neutralizer preferably comprises a quaternary ammonium complex component, an oxidizer component and a solvent, wherein the pH ranges from about 8 or greater. The processing pathway preferably comprises a dispensing or collection mechanism, such as a pesticide dispenser or chicken waste collector. As the agricultural chemical neutralizer follows the path of the organophosphorus agricultural chemical through its normal use cycle, residues and/or concentrations of the organophosphorus agricultural chemicals are effectively neutralized in a safe manner.

DETAILED DESCRIPTION OF THE PREFERRED EMBODIMENT

The present invention comprises a method for neutralizing organophosphorus agricultural chemicals. Organophosphorus agricultural chemicals remain contained within pesticide dispensing machinery after use as residue or concentrated within animal holding areas from animal waste. While organophosphorus agricultural chemicals are contained within these restricted or limited areas, or processing pathways, an agricultural chemical neutralizer is metered in the contaminated processing pathway to effectively neutralize the residual agricultural chemicals. The agricultural chemical neutralizer comprises a quaternary ammonium complex component, an oxidizer component and a solvent, having a pH range of from about 8 or greater. Optional incorporation of additional components may be included in the agricultural chemical neutralizer, as desired, particularly corrosion inhibitors and/or pH adjusters. The reaction of the agricultural chemical neutralizer of the present invention with organophosphorus agricultural chemicals, including pesticides and chicken feces, occurs rapidly and safely.

The method for neutralizing organophosphorus agricultural chemicals advantageously uses the processing pathway of the organophosphorus agricultural chemical. Unlike the problems encountered in countering chemical warfare agent use, organophosphorus agricultural chemicals are generally maintained within confined areas of high concentration in the form of residues, particularly within the dispensing systems for pesticides or the collection areas for animal waste. Processing pathways constitute the flow path or process, including the transiting and/or collection pathways, for the organophosphorus agricultural chemicals. For example, contamination of surface areas within a pesticide spreading machine remains confined within the spreading machine and associated component parts of the dispensing machinery along the path of the pesticide as it flows through the machinery. Also, within a pen area for farm animals, particularly chickens, the waste from the chickens remains within confined areas below the chickens or is mechanically or gravitationally moved into local holding areas before being washed or hauled away from site. The areas of contact of the contaminant, i.e., the flow path of the organophosphorus agricultural chemical, remain contaminated with residue or concentrated amounts of the organophosphorus agricultural chemical. The agricultural chemical neutralizer may be inserted into or interposed onto the contaminated surfaces, i.e., metered in, at any point of the processing pathway. This permits contact of given areas of expected or known contamination. Preferably the agricultural chemical neutralizer is metered through the processing pathway to contact more than one given contaminated area along the processing pathway of the organophosphorus agricultural chemical. More preferably, when possible, the agricultural chemical neutralizer is metered through the processing pathway in a manner that follows or mimics the flow of the organophosphorus agricultural chemical when it contacts and contaminates surface areas along the processing pathway. Within a pesticide dispensing system, the pesticide transits through a pathway as it is dispensed. Once dispensed, residual pesticide remains within the machinery. Application of the agricultural chemical neutralizer in, through and/or following the processing pathway of the machinery neutralizes the residue, allowing safe handling thereafter. Farm animals such as chickens or other types of birds may be confined within given areas for breeding and processing generate waste within these holding areas. The surface areas of contact contain residual contamination while the holding area of the waste contains concentrated amounts of the organophosphorus agricultural chemicals. Application of the agricultural chemical neutralizer in, through and/or following the processing pathway of the transit and holding sites of the waste allows safe handling thereafter.

With the organophosphorus agricultural chemicals confined in high concentrations and/or within limited areas, the application of the agricultural chemical neutralizer becomes particularly effective. The agricultural chemical neutralizer is metered through the pathway in a manner to effectively neutralize the residual (for pesticide dispensing machinery) or prevalent (for accumulated chicken feces) organophosphorus agricultural chemicals. Metering includes a regulated application of the agricultural chemical neutralizer in, through and/or following the processing pathway, which includes, for example, flowing onto, washing or scrubbing specific machinery parts or holding areas, passing unit amounts of agricultural chemical neutralizer through selected parts of the processing pathway, recycling a given amount of agricultural chemical neutralizer through the pathway, "running" selected amounts of the agricultural chemical neutralizer to mimic the path of the contaminant, or other methodologies of contacting effective amounts of the agricultural chemical neutralizer with the deposited organophosphorus agricultural chemicals. In addition to neutralization, the neutralized organophosphorus agricultural chemicals may be washed or flushed from the processing pathways with the flow of the agricultural chemical neutralizer, with the proper application of the agricultural chemical neutralizer for decontamination, washing, etc. determinable by those skilled in the art.

During the application of the agricultural chemical neutralizer, mechanical agitation or other means to increase contact between the deposited organophosphorus agricultural chemical with the agricultural chemical neutralizer is preferably used to efficiently contact the organophosphorus agricultural chemical with the agricultural chemical neutralizer to the greatest extent possible. Mechanical agitation includes scrubbing, spraying, pumping, and/or other localized methods of application of the organophosphorus agricultural neutralizer.

The agricultural chemical neutralizer comprises a composition comprising a quaternary ammonium complex component, an oxidizer component and a solvent. The pH of the composition preferably ranges from about 8 or greater.

The agricultural chemical neutralizer contains at least one QAC. QACs of the present invention comprises a general structure of:

where R, R', R", and R"' include alkyl or aryl substituents chemically bonded to the nitrogen atom, N, through a carbon atom. The quaternary ammonium complex preferably comprises a benzyl compound. Preferred benzyl QACs include the chloride salts of benzyltriethylammonium and benzyltrimethylammonium, which are disclosed in U.S. Pat. Nos. 5,760,089 and 5,859,064, both to the present inventor Donald T. Cronce and commonly assigned, the disclosures of which were previously incorporated by reference. Suitable amounts of QAC are used in the agricultural chemical neutralizer, preferably ranging from about 15% by weight or more, more preferably from about 15% by weight to about 45% by weight, still more preferably from about 15% by weight to about 35% by weight and most preferably having amounts of QAC ranging from about 15% by weight to about 25% by weight of the agricultural chemical neutralizer. An individual QAC or combinations of QACs can be used within the agricultural chemical neutralizer, with mixtures of benzyltrimethylammonium chloride and benzyltriethylammonium chloride in ratios, such as, from about 5:1 parts to about 1:5 parts, by weight. Preferably the benzyltrimethylammonium chloride is included in mixtures having from about 2 to about 5 times the amount of benzyltriethylammonium chloride. One skilled in the art may readily substitute other appropriate salts for the chloride salt of the QAC. Particularly preferred salts include the hydroxide salts.

The agricultural chemical neutralizer further comprises an oxidizer suitable for combination with the QAC. The oxidizer preferably comprises the acids or salts of peroxy or hydroperoxy compounds such as peracetate, perborate monohydrate, perborate tetrahydrate, monoperoxyphthalate, peroxymonosulfate, peroxydisulfate, percarbonate, hydrogen peroxide and other like compounds. Still other suitable oxidizers may be readily selected from among those which are compatible with the remainder of the components present in the agricultural chemical neutralizer. Generally, the oxidizer is present in an amount between about 15 to about 25%, by weight, and more preferably, about 20%, by weight, of the total weight of the agricultural chemical neutralizer. Most preferably, the oxidizer comprises hydrogen peroxide.

Solvents are used, as desired, for mixing with the QAC for application and handling purposes. Generally, suitable solvents include non-flammable, non-corrosive, and nontoxic compositions. The preferred solvent for waste decontamination comprises water, which is present in an amount between about 25% to about 35%, by weight, of the agricultural chemical neutralizer and, more preferably, approximately 30% by weight of the agricultural chemical neutralizer. The preferred solvent for dispensing machinery comprises a diol. One particularly desirable diol is 1,2-propanediol (i.e., propylene glycol). However, other diols capable of solvating both polar and low-polarity compounds may be readily substituted. For example, suitable diols may include other 1,2-alkanediols, particularly where the alkane is butane, pentane or hexane. Where the solvent used is propylene glycol, it is preferably present in an amount of about 15 to 25%, by weight, of the composition, i.e., roughly equivalent to the weight percentage of the QAC present in the composition.

Additionally, the agricultural chemical neutralizer may comprise a corrosion inhibitor particularly with use in dispensing machinery. Corrosion inhibitor maybe included in amounts of from about 15% by weight or more of the agricultural chemical neutralizer. Preferably, the corrosion inhibitor comprises isobutanolamine. Suitable corrosion inhibitors include amino alcohols, such as 2-amino-2-methyl-1-propanol. One of skill in the art may substitute other non-toxic corrosion inhibitors, which may be selected from among primary amines and polyamines. For example, when the agricultural chemical neutralizer of the invention is water-based, as described herein, a corrosion inhibitor is needed and may also be used as a solvent. In such a formulation, the corrosion inhibitor maybe found in an amount up to about 55%, by weight, of the agricultural chemical neutralizer. Alternatively, when the solvent is a diol, the corrosion inhibitor may make up less than about 10%, by weight, of the agricultural chemical neutralizer formulation. In addition to the corrosion inhibitor, the agricultural chemical neutralizer may optionally contain preservatives, buffers, and reaction catalysts, which may be readily selected by one skilled in the art.

The agricultural chemical neutralizer may further comprises a pH adjustor in amounts suitable for maintaining the agricultural chemical neutralizer in a pH range of from about 8 or greater. Preferred pH adjustors include, for example, hydrochloric acid, toluenesulfonic acid, and combinations thereof, as well as other similar pH adjustors for pH control. Suitable amounts of pH adjustor may range from about 15% by weight or more, such as from about 25% by weight to about 40% by weight, of the agricultural chemical neutralizer. The agricultural chemical neutralizer containing the QAC and oxidizer is provided with a pH of between about 8 and about 12, and preferably, between about 8 and 10. Suitable acids for lowering the pH (increasing acidity) and bases for raising pH (increasing alkalinity) may be readily selected by those skilled in the art.

The agricultural chemical neutralizer may also contain stabilizers which alone, or in combination with the pH adjuster, prevent reaction of the oxidizer with the other components of the formulation without inhibiting the ability of the agricultural chemical neutralizer to solvate and neutralize organophosphorus agricultural chemicals. Where the stabilizer is used in conjunction with a separate pH adjuster, the stabilizer is preferably selected from among those which do not significantly alter the pH of the agricultural chemical neutralizer. Suitable stabilizers may be readily selected by those skilled in the art, taking into consideration the selected oxidizer and the other components in the agricultural chemical neutralizer formulation. For example, where the oxidizer is hydrogen peroxide, the stabilizer is preferably acetanilide. Generally, stabilizers are present in an amount of less than about 1% of the agricultural chemical neutralizer.

In operation, the application of the oxidizer in combination with the QAC of the agricultural chemical neutralizer works quickly and effectively to solvate and neutralize organophosphorus agricultural chemicals within processing pathways, and works particularly well for neutralization of organosulfur contaminates contained within pesticides and chicken feces. Preferably, neutralization is effected by metering the agricultural chemical neutralizer into the contaminated processing pathway. Metering includes flowing or washing large amounts of agricultural chemical neutralizer in, through, or following organophosphorus agricultural chemicals in specific or small areas of expected or known areas of residual or concentrated contamination. The agricultural chemical neutralizer compositions remain nontoxic while useful in detoxifying/neutralizing a variety of organophosphorus agricultural chemicals. Generally, such application is primarily guided by decreasing the exposure, initial or continuous, of the neutralizer to personnel. The type of application to minimize exposure with any particular application means generally follows the normal operating flow of dispensing machinery or collection means, with the amount of agricultural chemical neutralizer generally applied as a factor of the concentration, extent of contamination, recycling capabilities for the neutralizer, amount of agitation, etc., with the proper application amounts and concentration readily determinable by those skilled in the art. Preferably the agricultural chemical neutralizer is used in amounts to sufficiently blanket or cover the entire area of contamination for time periods of from about thirty minutes to about 2 hours, during which time agitation of the contacting agricultural chemical neutralizer with the organophosphorus agricultural chemicals occurs.

Test Procedures $^{31}P$ nuclear magnetic resonance spectroscopy (NMR) was used to quantify reaction rates and products from the pesticide-agricultural chemical neutralizer reactions. Pesticide and agricultural chemical neutralizer mixture were run undiluted. Spectra chemical shifts were referenced to a phosphoric acid chemical shift value of 0.00. A Varian 300 MHz NMR, available from Varian, Inc. of Palo Alto, Calif. was used to record the spectra. Gas chromatography (GC) studies also were conducted. All testing trials were allowed to run to completion.

The GC chromatographs were complex, however, the un-reacted pesticide had a unique retention time, i.e., peak position, or detector response at its retention time much larger than any other detector response at similar retention time, i.e., the pesticide peak remained un-hidden or un-buried by other peaks, allowing proper reaction evaluation. For example, dichlorovos alone had a retention time of 7.13 minutes and the chromatograph of the agricultural chemical neutralizer alone showed no response at 7.13. Malathion had a retention time of 10.09 minutes that corresponded with a broad peak of the agricultural chemical neutralizer, however, the broad agricultural chemical neutralizer peak had a maximum detector response of approximately 54 millivolts (mV) at about 10.4 minutes retention time and 12.5 mV at 9.8 minutes while malathion alone had a detector response of nearly 70 mV at 10.1 minutes.

NMR was used to measure on the phosphorus atoms in real time. By following the disappearance of the pesticide peak from the NMR spectrum, reaction rate information was derived. By following the appearance and/or disappearance of the intermediate and final product peaks in the spectra, additional rate and reaction mechanism information was derived for chemical identification.

Highly concentrated, undiluted pesticide was added to 1 ml agricultural chemical neutralizer to obtain a 50:1 weight/weight ratio of agricultural chemical neutralizer to pesticide. The mixture was combined directly in the NMR sample tube or vortex-mixed externally without dilution. The agricultural chemical neutralizer was prepared with QACs of benzyltrimethyl and benzyltriethyl ammonium chlorides manufactured by Aldrich Chemical Company of Milwaukee, Wis. in an amount of 17.5% (w/w) which was mixed with isobutanolamine manufactured by Aldrich Chemical Company of Milwaukee, Wis. in an amount of 25% (w/w). The pH was adjusted using toluenesulfonic acid, lowering the pH to approximately 8.7. Hydrogen peroxide was obtained commercially from Degussa Corporation of Cherry Hill, N.J., and was added to the mixture after the pH adjustment in an amount of 20% (w/w).

EXAMPLE 1

An organophosphorus pesticide have a phosphorus-sulfur double bond (P=S) and three oxygen atoms (diazinon) was selected for testing. The pesticide was purchased from Chem Service, Inc., of West Chester, Pa. and certified as having a purity of at least 98%. Diazinon, shown below, has a chemical composition of diethyl 2-isopropyl-4-methyl-6-pyrimidyl thionophosphate ($C_{12}H_{21}N_2O_3PS$). It is a nitrogen heterocyclic type of pesticide. It was introduced commercially in 1952 and has been marketed under a variety of names such as Dianonr, Diazider, Diazolr, Neocidalr, and Sarolexr

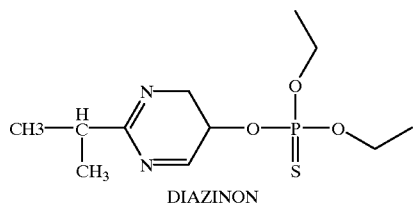

DIAZINON

As shown below (Equation 1), diazinon reacts with the agricultural chemical neutralizer to form an intermediate product before reacting further to form the final dialkyl phosphate product. The intermediate product is a simple rearrangement of the diazinon to the corresponding phosphorothiolate. The intermediate eventually is hydrolyzed at the sulfur atom to diethyl phosphate. Diazinon had the slowest reaction rate among five pesticides evaluated, and required external mixing before the NMR testing. Diazinon is a liquid at room temperature and is not readily miscible with the agricultural chemical neutralizer.

$$(CH_3CH_2O)_2P(=S)OR \rightarrow (CH_3CH_2O)_2P(=O)SR \rightarrow (CH_3CH_2O)_2P(=O)OH \quad (1)$$

EXAMPLE 2

An organophosphorus pesticide having a phosphorus-sulfur double bond (P=S) and two oxygen atoms and one sulfur atom (malathion) was selected for testing. The pesticide was purchased from Chem Service, Inc., of West Chester, Pa. and certified as having a purity of at least 98%. Malathion, shown below, has a chemical composition of S-[1,2-dicarbethoxyethyl]-O,O-dimethyl-dithiophosphate.

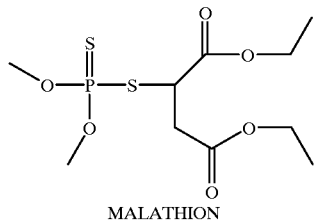

MALATHION

Malathion reacted with the agricultural chemical neutralizer through two intermediates before forming the final dialkyl phosphate product, as shown below (Equation 2). The first intermediate was a change of P=S to P=O. The second intermediate replaced the thioester with a peroxy component. The peroxy group then reduced to a hydroxyl to form the final product. The malathion required the use of the hydrogen peroxide for reaction to the peroxy intermediate. Malathion required external mixing prior to NMR testing. Malathion is a liquid at room temperature, but was not readily miscible in the agricultural chemical neutralizer.

$$(CH_3O)_2P(=S)SR \rightarrow (CH_3O)_2P(=O)SR \rightarrow (CH_3O)_2P(=O)OOH \rightarrow (CH_3O)_2P(=O)OH \quad (2)$$

EXAMPLE 3

Two organophosphorus pesticides having a phosphorus-oxygen double bond (P=O) and three oxygen atoms (paraoxon and dichlorovos) were selected for testing.

Paraoxon, shown below, has a chemical composition of diethyl-p-nitrophenyl phosphate. Paraoxon was purchased from Chem Service, Inc., of West Chester, Pa. and certified as having a purity of at least 98%.

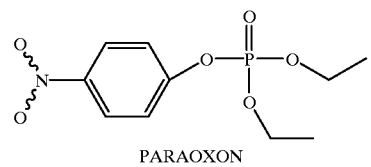

PARAOXON

Dichlorovos, shown below, has the chemical composition of O,O-dimethyl O-2,2-dichlorovinyl phosphate ($C_4H_7Cl_2O_4P$). Dichlorovos is used primarily to control household insects such as flies, aphids, spider mites, caterpillars, and thrips. The chemical is also used therapeutically against parasitic worm infections in dogs, livestock, and humans. The mechanism of action appears to be a contact poison and stomach poison in insects caused by interference with cholinesterase, a neurological enzyme that is important to nerve transmissions. Dichlorovos was purchased from Pfaltz & Bauer, Inc. of Waterbury, Conn.

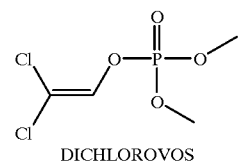

DICHLOROVOS

Both paraoxon and dichlorovos readily reacted with the agricultural chemical neutralizer, as shown below (Equations 3 and 4, respectively). The pesticides proceeded directly to the final dialkyl phosphate product without going through any identifiable intermediates. The final products appeared to be formed through a simple hydrolysis reaction involving the vinyl group of the dichlorovos and the nitrophenyl group ("R" in Equation 3) of the paraoxon. Both dichlorovos and paraoxon are liquids at room temperature and were readily miscible with the agricultural chemical neutralizer.

$$(CH_3CH_2O)_2P(=O)OR \rightarrow (CH_3CH_2O)_2P(=O)OH \quad (3)$$

$$(CH_3O)_2P(=O)OCH=CCl_2 \rightarrow (CH_3O)_2P(=O)OH \quad (4)$$

EXAMPLE 4

An organophosphorus pesticide having a phosphorus-oxygen double bond (P=O) and one oxygen atom, one sulfur atom and one nitrogen atom (methamidophos) was selected for testing. The pesticide was purchased from Chem Service, Inc., of West Chester, Pa. and certified as having a purity of at least 98%. Methamidophos, shown below, has the composition of O, S-dimethyl phosphoramidothioate. Methamidophos is widely used to control insects for vegetables, cotton, tobacco, rice and flowers.

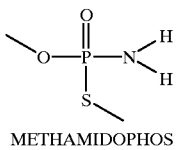

METHAMIDOPHOS

Methamidophos reacted quickly with the agricultural chemical neutralizer. Methamidophos proceeded directly to the final product, and was hydrolyzed at the sulfur atom to a final phosphoroamidate product shown below (Equation 5). Methamidophos is a solid at room temperature, and easily dissolved in the agricultural chemical neutralizer.

$$CH_3OP(=O)NH_2)SCH_3 \rightarrow CH_3OP(=O)(NH_2)OH \quad (5)$$

Testing Results

Dichlorovos had the fastest reaction rate, methamidophos had the second fastest reaction rate and paraoxon had the third fastest reaction rate.

Table 1, below, shows the GC and $^{31}P$ NMR results of Examples 1–4.

TABLE 1[a]

| Pesticide | GC | | NMR | |
| --- | --- | --- | --- | --- |
| | Retention Time (min) | Major Product Retention Time (min) | Chemical Shift (ppm) | Chemical Shift of Major Product(s) (ppm) |
| Dichlorovos | 7.13 | 3.20, 3.39, 8.94 (b) | −2.81 | −3.00, 2.85 |
| Malathion | 10.09 | 2.75 | 95.32 | 59.00, 29.28, 2.99 |
| Diazinon | 9.57 | 2.50, 9.1–9.4 | 60.63 | 55.50, 0.56 |
| Paraoxon | 9.99 | 8.32 (b), 9.36 | −6.89 | 0.57 |
| Methamidophos | 7.29 | 8.51 (b) | 40.56 | 10.88 |

Footnote
[a] min = minutes; ppm = parts per million; b = broad

The five pesticides evaluated, representing four types of organophosphorus pesticide chemical structures, all reacted efficiently with the agricultural chemical neutralizer to produce relatively nontoxic final products. The reactivity of the pesticides with the agricultural chemical neutralizer is sufficiently complete for use within the flow pathway of the organophosphorus agricultural chemicals.

EXAMPLE 5

Prophetic

Dispensing machinery having two holding tanks and numerous nozzles is used to spray pesticide onto areas of crops. Upon completion of the spraying, agricultural chemical neutralizer of the present invention is placed into the holding tanks, and the nozzles are connected through feed lines to spray back into the holding tanks. The dispensing machinery is activated for a period of two hours, after which time the nozzles are connected to fill a transport container to properly dispose of the neutralized pesticide contained within the agricultural chemical neutralizer. The dispensing machinery is effectively safe for human contact, and the neutralization of the organophosphorus agricultural chemicals is effected without environmental contamination.

EXAMPLE 6

Prophetic

Chickens are held within pen area for a period of a week, with waste accumulated in a removable holding area below the chickens. The removable holding area is removed from the chicken pen area, after which agricultural chemical neutralizer of the present invention is pumped onto the waste within the holding area. After a period of thirty minutes, the waste/agricultural chemical neutralizer combination is pumped to a transport container. After the removal of the waste/agricultural chemical neutralizer combination from the holding area, additional agricultural chemical neutralizer is sprayed onto the walls of the holding area, which is then scrubbed with mops over a period of three hours. The transport container is transported to a facility to properly dispose of the neutralized waste contained within the agricultural chemical neutralizer. The holding area is effectively safe for human contact, and the neutralization of the organophosphorus agricultural chemicals is effected without environmental contamination.

The foregoing summary, description, and examples of the present invention are not intended to be limiting, but are only exemplary of the inventive features which are defined in the claims.

What is claimed is:

1. A method for neutralizing organophosphorus agricultural chemicals, comprising the steps of:
    passing an agricultural chemical through a processing pathway; and then,
    metering an agricultural chemical neutralizer in the processing pathway effective to neutralize organophosphorus agricultural chemicals therein.

2. The method of claim 1, wherein the agricultural chemical neutralizer comprises a composition comprising a quaternary ammonium complex component, an oxidizer component and a solvent, wherein the pH ranges from about 8 or greater.

3. The method of claim 2, wherein the quaternary ammonium complex component comprises a benzyl compound.

4. The method of claim 3, wherein the benzyl compound is selected from the group consisting of benzyltrimethylammonium chloride, benzyltriethylammonium chloride and combinations thereof.

5. The method of claim 2, wherein the quaternary ammonium complex component comprises an amount of from about 15 weight percent or more of the agricultural chemical neutralizer.

6. The method of claim 5, wherein the quaternary ammonium complex component comprises an amount of from about 15 weight percent to about 25 weight percent of the agricultural chemical neutralizer.

7. The method of claim 2, wherein the oxidizer is selected from the group consisting of the acids or salts of peracetate, perborate monohydrate, perborate tetrahydrate, monoperoxyphthalate, peroxymonosulfate, peroxydisulfate, percarbonate and hydrogen peroxide.

8. The method of claim 7, wherein the oxidizer comprises hydrogen peroxide.

9. The method of claim 2, wherein the oxidizer comprises an amount of from about 15 weight percent or more of the agricultural chemical neutralizer.

10. The method of claim 9, wherein the oxidizer comprises an amount of from about 16 weight percent to about 25 weight percent of the agricultural chemical neutralizer.

11. The method of claim 2, wherein the agricultural chemical neutralizer further comprises a corrosion inhibitor.

12. The method of claim 11, wherein the corrosion inhibitor comprises an amount of from about 15 weight percent or more of the agricultural chemical neutralizer.

13. The method of claim 11, wherein the corrosion inhibitor comprises isobutanolamine.

14. The method of claim 2, wherein the agricultural chemical neutralizer further comprises a pH adjustor selected from the group consisting of hydrochloric acid, toluenesulfonic acid, and combinations thereof.

15. The method of claim 14, wherein the pH adjustor comprises an amount of from about 25 weight percent to about 40 weight percent of the agricultural chemical neutralizer.

16. The method of claim 1, wherein the processing pathway comprises a dispensing mechanism.

17. The method of claim 16, wherein the dispensing mechanism comprises a pesticide dispenser.

18. The method of claim 1, wherein the processing pathway comprises a collection mechanism.

19. The method of claim 18, wherein the collection mechanism collects bird waste.

20. The method of claim 19, wherein the collection mechanism collects chicken waste.

* * * * *